Oct. 4, 1955
J. W. DUKE, JR
2,719,756
AUTOMATIC WHEEL BALANCER
Filed Dec. 20, 1954
3 Sheets-Sheet 1
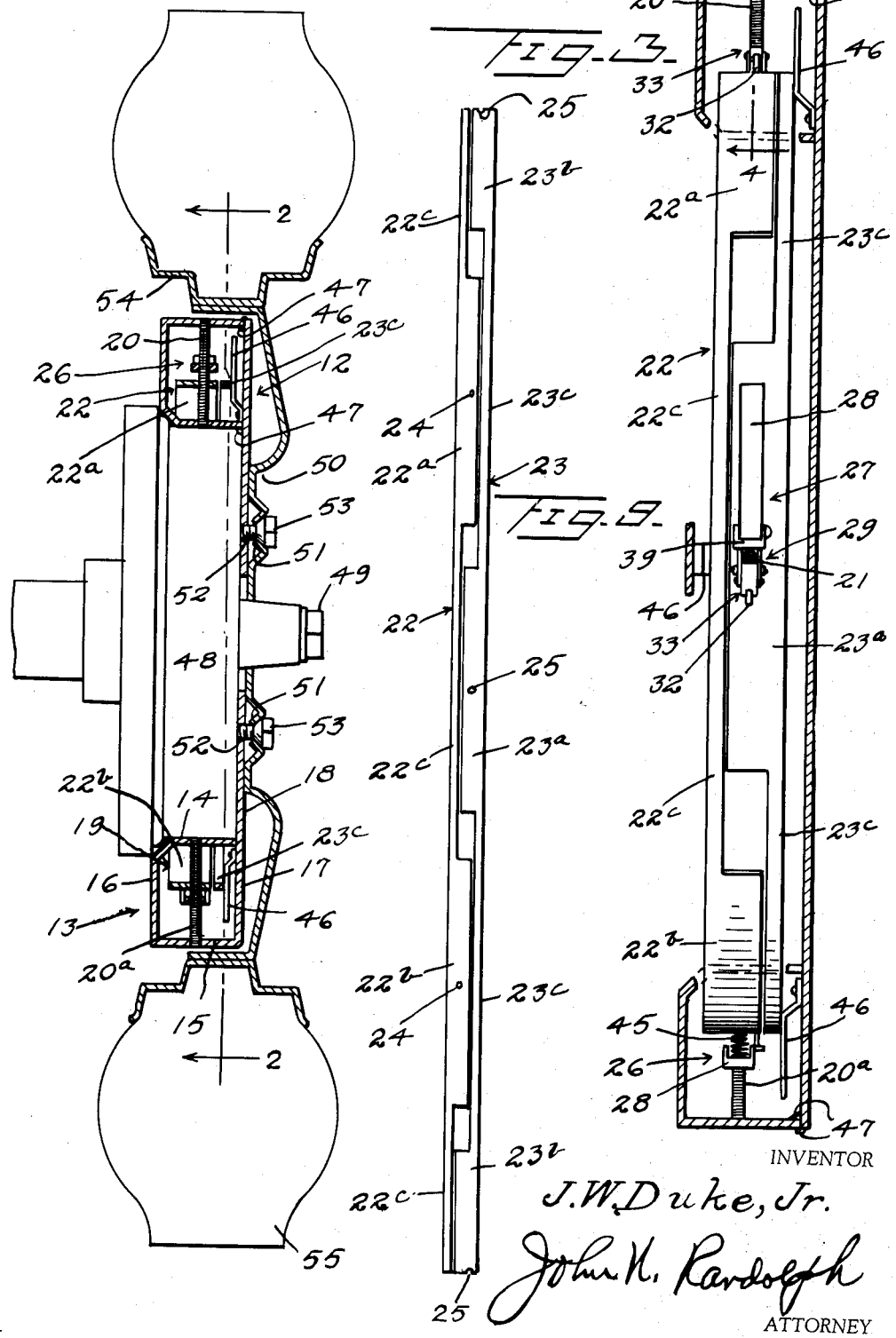
INVENTOR
J. W. Duke, Jr.
John K. Randolph
ATTORNEY

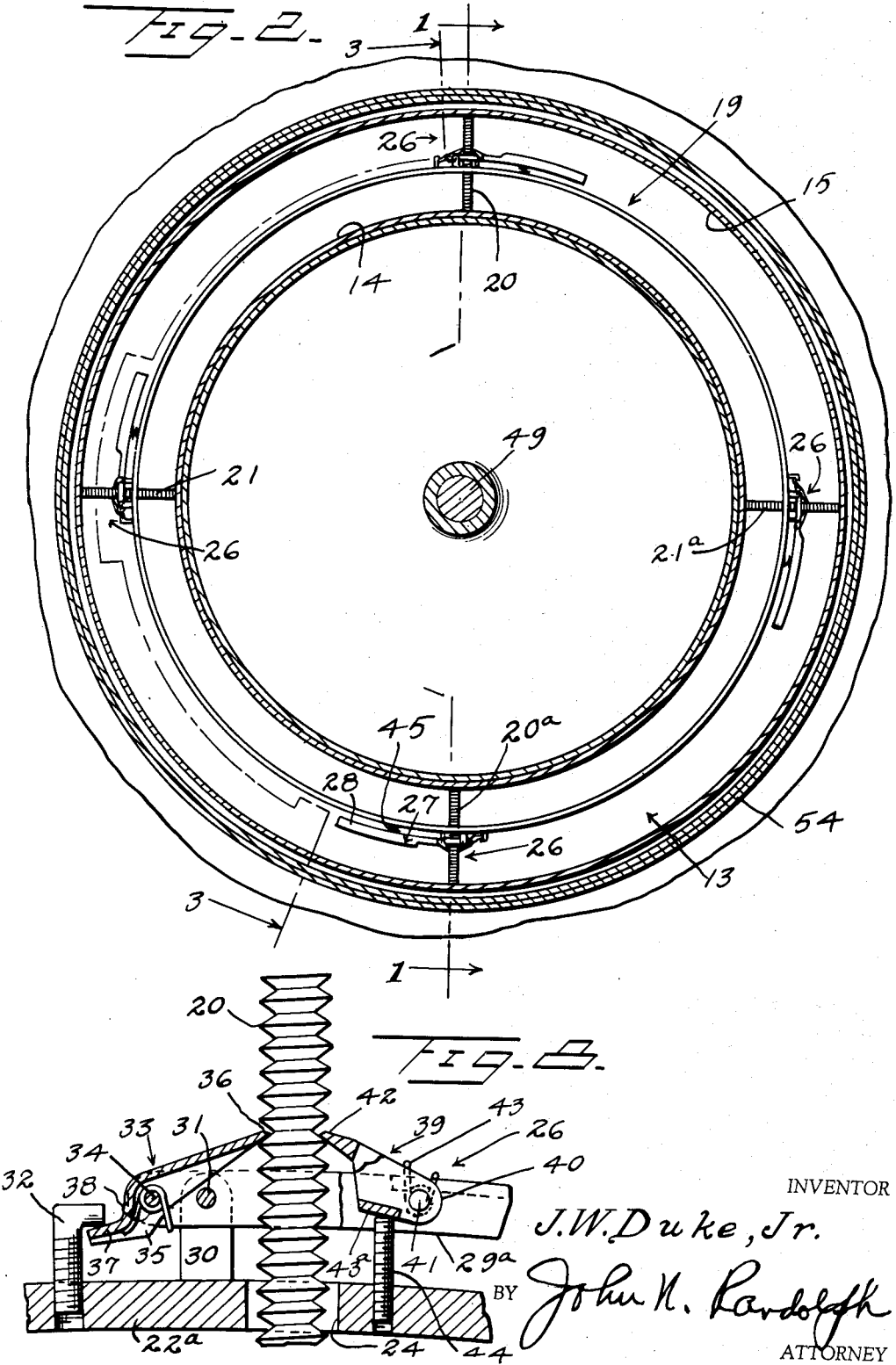

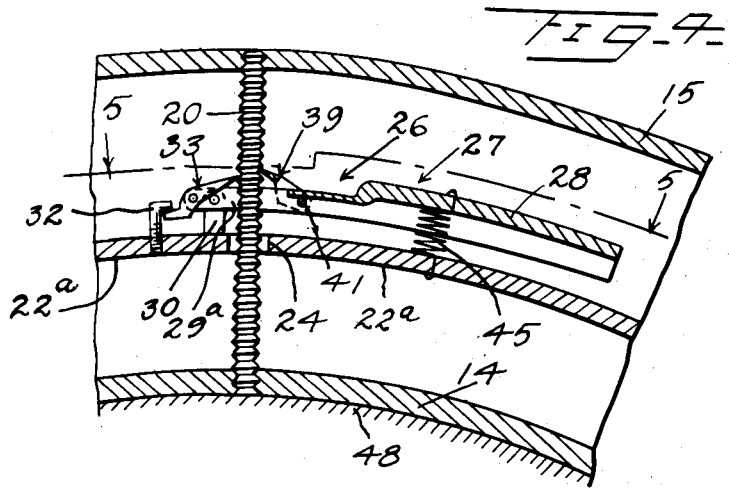
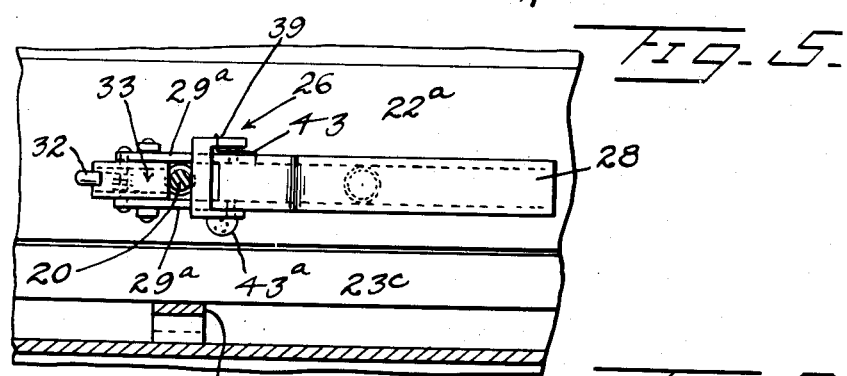
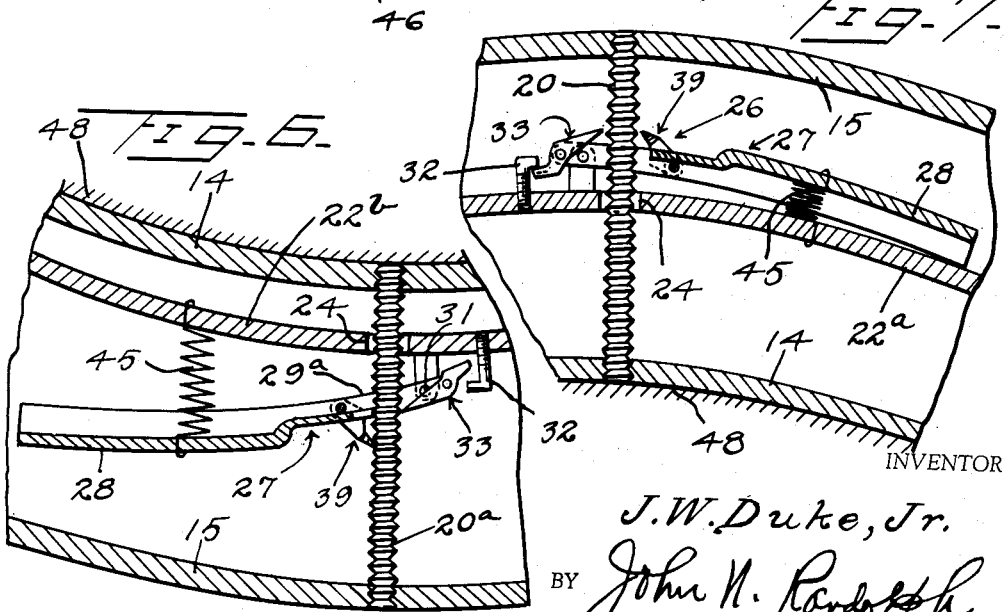

United States Patent Office 2,719,756
Patented Oct. 4, 1955

2,719,756
AUTOMATIC WHEEL BALANCER
John W. Duke, Jr., Chattanooga, Tenn.
Application December 20, 1954, Serial No. 476,326
10 Claims. (Cl. 301—5)

This invention relates to a unit of extremely simple construction adapted to be mounted on a vehicle wheel and which is responsive to a dynamically unbalanced wheel condition to automatically cause an operation of the wheel balancer whereby a weighted part by a jacking action will be displaced radially away from the wheel axis adjacent a light portion of the wheel and a diametrically opposite weighted part, located adjacent a heavy area of the wheel, will be simultaneously displaced radially inward to effect a balancing of the wheel.

More particularly, it is an aim of the present invention to provide an automatic wheel balancer which is responsive to centrifugal force for effecting a radial shifting of weighted portions of the wheel balancer whenever the wheel is revolving and is dynamically unbalanced.

Still another object of the invention is to provide a wheel balancer having novel jacking units responsive to centrifugal force for effecting a radial shifting of weighted portions of the balancing unit to eliminate an unbalanced wheel condition.

Still another object of the invention is to provide a wheel balancer of extremely simple construction constituting a self-contained unit which may be readily mounted on a conventional vehicle wheel in substantially a concealed position and which will function automatically to correct an unbalanced condition of the wheel and to thereafter maintain the wheel in proper dynamic balance.

Various other objects and advantages of the invention will hereinafter become more fully apparent from the following description of the drawings, illustrating a presently preferred embodiment thereof, and wherein:

Figure 1 is a transverse sectional view of the wheel balancer and a vehicle wheel and showing the parts mounted on a vehicle brake drum, and taken substantially along a plane as indicated by the line 1—1 of Figure 2;

Figure 2 is a fragmentary sectional view of the wheel balancer and a part of the wheel, taken substantially along a plane as indicated by the line 2—2 of Figure 1;

Figure 3 is an enlarged fragmentary sectional view, partly in elevation of the wheel balancer, taken substantially along a plane as indicated by the line 3—3 of Figure 2;

Figure 4 is an enlarged fragmentary sectional view, taken substantially along a plane as indicated by the line 4—4 of Figure 3;

Figure 5 is a fragmentary sectional view, taken substantially along a plane as indicated by the line 5—5 of Figure 4;

Figure 6 is a fragmentary sectional view similar to Figure 4 but showing parts of the wheel balancer functioning to effect a radial displacement of weighted parts of the wheel balancer to overcome an unbalanced wheel condition;

Figure 7 is a view similar to Figure 6 showing a portion of the wheel balancer disposed directly opposite to the part thereof as seen in Figure 6;

Figure 8 is an enlarged fragmentary sectional view of a part of the wheel balancer as shown in Figure 2 and illustrating in detail how the actuating parts thereof will appear when a wheel with which the balancer is associated is dynamically balanced, and Figure 9 is a plan view of annular parts of the wheel balancer shown removed from the unit and as said parts would appear extended and flat.

Referring more specifically to the drawings, the wheel balancer in its entirety and comprising the invention is designated generally 12 and includes an annular casing, designated generally 13, which is preferably formed of sheet metal and which includes annular inner and outer walls 14 and 15, respectively, connected by side walls including a rear wall 16 and a front wall 17. The front wall 17 has an inwardly extending annular flange 18.

Disposed within the annular chamber of the casing 13 is the automatic balancing unit, designated generally 19, which includes four equally spaced posts 20, 20a, 21 and 21a, as best seen in Figure 2. Each of said posts is radially disposed relative to a casing 13 and has an inner end anchored in the inner wall 14 and an outer end anchored in the outer wall 15. Said posts are threaded or provided with teeth, as best illustrated in Figure 8. The posts are disposed substantially midway between the side walls 16 and 17. A pair of wheel balancing rings 22 and 23 are mounted in the casing 13 on the posts 20 and 20a and 21 and 21a, respectively. Said rings each has two relatively wide weighted portions, comprising the weighted portions 22a and 22b of the ring 22 and the weighted portions 23a and 23b of the ring 23. Said weighted portions are circumferentially spaced relative to one another and are each of a length substantially less than the length of narrow connector portions 22c and 23c of the rings 22 and 23, respectively, as best seen in Figure 9. The wide weighted portions of the rings 22 and 23 are disposed in staggered relation to one another and in spaced apart end-to-end relation, as seen in Figures 3 and 9. The wide portions of the rings 22 and 23 are provided intermediate of their ends with openings 24 and 25, respectively, for loosely engaging the posts 20 and 20a and 21 and 21a, respectively, for supporting the ring 22 for movement diametrically of the casing 13 substantially axially of the posts 20 and 20a and for supporting the ring 23 for similar movement relative to the posts 21 and 21a. Said rings 22 and 23 are movable in the casing 13 independently of one another.

The balancing unit 19 includes four identical centrifugally actuated jacks, each designated generally 26. A jack 26 is associated with each post and with each of the weighted ring portions 22a, 22b, 23a and 23b. Each jack 26 includes an elongated lever or arm 27 having a weighted end 28 and an opposite bifurcated end 29. The furcations 29a of the bifurcated end 29 loosely straddle the rack post with which the jack 26 is associated and said furcations 29a near to but spaced from their distal ends are straddled by a pair of bearing standards 30 which are fixed to and project outwardly from the widened ring portion through which the associated post extends. A pivot 31 extends through said furcations 29a and the standards 30 for swingably mounting the lever 27 on the outer side of the ring on which it is supported, as illustrated in Figures 2 and 8. The standards 30, as seen in Figure 2, are spaced a slight distance in a counterclockwise direction from the adjacent post which is individual thereto and the associated lever 27 extends clockwise from the standards 30 and from the associated post, as seen in Figure 2. A hook 32 is fixed to each wide ring portion adjacent the standards 30 thereof and projects outwardly from the ring portion and is spaced from the standards 30 thereof in a counterclockwise direction, as seen in Figure 2.

As best seen in Figure 8, a holding pawl 33 is pivotally mounted intermediate of its ends between the distal ends of the furcations 29a on a pivot pin 34 which extends loosely through downturned side flanges 35 of said pawl. The pawl 33 has a longer end extending from the pivot 34 toward the associated post and which terminates in an edge portion 36 which engages between teeth or thread convolutions of said post, and which is disposed above the level of the pivot 34. The other shorter end 37 of the pawl 33 extends downwardly in the opposite direction away from the standards 30 and engages under the bill of the hook 32 which faces toward said standards. A spring 38 which is wound on the pivot pin 34 has one end anchored to one of the furcations 29 and its other end bearing against the underside of the pawl end 37 to urge the pawl 33 to rock clockwise about its pivot 34, as seen in Figure 8, for urging the longer pawl end and edge 36 downwardly and toward the adjacent threaded post and for urging the shorter pawl end 37 upwardly and into engagement with the underside of the bill of the hook 32.

A jacking pawl 39 has laterally spaced side members 40 which straddle the furcations 29a, on the opposite side of the threaded post to the lever pivot 31 and through which a pivot 41 loosely extends for swingably mounting the jacking pawl 39 on the lever 27. The jacking pawl 39 extends upwardly from the lever 27 at an angle toward the adjacent threaded or toothed post and has an edge 42 defining the free end thereof which fits loosely between teeth or thread convolutions of the post. A spring 43 is wound on the pivot 41 and has one end engaging over a part of the pawl 39 and an opposite end anchored to one of the furcations 29a for urging the pawl 39 to swing downwardly and toward the threaded post with which it is associated. As seen in Figure 8, one of the side walls 40 has an outturned flange or lip 43a which is disposed over an adjustable stop 44 which is threadedly mounted in and projects outwardly from the adjacent wide ring portion. A combination compression and tension spring 45 is mounted between a part of said wide ring portion and an intermediate part of the weighted lever end 28 and has one end secured to the ring portion and the other end secured to the weighted lever part, for normally supporting the lever in a position substantially concentric of its associated ring, as illustrated in Figures 2 and 7.

Leaf springs 46 are disposed within and extend radially of the annular chamber of the casing 13 and are secured at their inner ends to the walls 16 and 17. The springs 46 yieldably bear against the outer edges of the narrow ring portions 22c and 23c to maintain the rings 22 and 23 in relatively snug interfitting engagement with one another.

It will be understood that the balancing rings 22 and 23 are mounted on the threaded posts after the jacks 26 have been applied thereto, after which the threaded posts are mounted at their ends in the walls 14 and 15. The springs 46 having previously been assembled on the inner sides of the walls 16 and 17, the casing 13 is thereafter completed. This may be accomplished in any desired manner, as by forming the front wall 17 and its flange 18 separate from the walls 14 and 15 and securing the walls 14 and 15 thereto, as by welding as seen at 47 in Figures 1 and 3.

The annular casing 13 is then positioned around a brake drum 48 from which the wheel has been removed with the flange 18 bearing against the outer or front face of the brake drum and being disposed around the wheel axle 49. A wheel 50 is then applied to the lug receiving openings 51 which align with lug receiving openings 52 of the flange 18 to receive conventional lug fastenings 53 which thus mount both the wheel 50 and the wheel balancer 12 on the brake drum 48. As clearly illustrated in Figure 1, the annular casing 13 is disposed on the inner side of the wheel 50 and between the brake drum 48 and the rim 54 of the wheel 50. Thus, the wheel balancer 12 is disposed inwardly of the wheel. In the event that the rim 54 is located too close to the periphery of the brake drum 48 to accommodate the annular casing 13 therebetween, the flange 18 may protrude to the left as seen in Figure 1 between the brake drum 48 and rim 54 to support the annular casing 13 to the left of or inwardly with respect to the wheel and brake drum. Obviously, the radial thickness of the annular casing 13 can be varied depending upon the spacing between the brake drum and rim.

Assuming that a wheel balancer 12 is mounted on each wheel and its associated brake drum of a vehicle, the automatic balancing unit 19 of each wheel balancer 12 functions only in conjunction with the vehicle wheel with which it is associated. If said wheel and its pneumatic tire 55 is in proper balance, the automatic balancing unit 19 will maintain its position as seen in Figure 2 with all parts of the automatic wheel balancer 12 remaining in balance and with the rings 22 and 23 retained in concentric positions within the casing 13, relative to one another and to the casing, brake drum and wheel.

However, if the wheel 50 is dynamically unbalanced, as the wheel revolves and the heavy part thereof approaches a bottom-most position as illustrated in Figure 6, assuming that the post 20a and the associated centrifugal jack 26 are located adjacent the heavy part of the wheel 50, the weighted end 28 of the lever 27 of said jack 26 will swing outwardly and away from the ring portion 22b on which it is mounted. As the jack lever 27 of the ring part 22b thus swings outwardly and away from said ring part about its pivot 31, the pawl end 42 by engagement with a tooth or thread of the post 20a will be prevented from moving relative to the post 20a toward the outer casing wall 15. Consequently, after a very slight outward swinging movement of the lever 27, a further rocking movement of the lever relative to the pivot 31 will result from the fact that the ring portion 22b will be displaced radially inward toward the inner casing wall 14. As the lever 27 thus assumes a greater angle relative to the ring portion 22b, the outer end of the pawl 33 will move away from the bill of the hook 32 since said pawl 33 rocks with the distal ends of the furcations 29a in the opposite direction or toward the ring portion 22b. Thus, the edge 36 of the longer end of the pawl 33 rides over the teeth or threads of the post 20a as said edge 36 moves inwardly of the casing 13 toward the inner wall 14.

In order that the ring portion 22b may thus be displaced radially inwardly of the casing 13, since the rings 22 and 23 are rigid, it is necessary that the diametrically opposite part 22a of the ring 22 move radially outward of the casing toward the outer wall 15. As the lever 27 of the ring part 22b commences to swing outwardly from its position as seen at the bottom of Figure 2 to its position of Figure 6, the lever 27, carried by the ring part 22a, is in the position as seen at the top of Figure 2 and in Figure 4. However, as the ring 22 is displaced diametrically upward, the standards 30 of the ring part 22a exert a radial outward thrust on the bifurcated lever end 29 and at the same time the abutment 44 exerts an outward thrust on the lip 43a of the pawl 39. The outward thrust thus exerted on the lever 27 at its pivot 31 by the standards 30 causes the lever 27 to rock slightly on its pivot 31 in a clockwise direction from its position of Figure 4 to its position of Figure 7. This slight rocking movement is sufficient to cause the pawl end 37 which is engaging under the hook 32 to rock the pawl 33 counterclockwise as seen in Figures 4 and 8 about its pivot 34 and against the action of the pawl spring 38 from the engaged position of the pawl end 36 with the post 20, as seen in Figures 4 and 8, to a disengaged position of the pawl 33, as seen in Figure 7, and wherein the pawl end 36 is disengaged from the teeth or thread of the post 20. At the same time, the lever portion carrying the pawl 39 swings toward the ring part 20a forcing the lip 43a against the abutment 44 which thus causes the pawl 39 to swing clockwise on its pivot 41 from its engaged position of Figures 4 and 8 with the post 20 to its disengaged position, as seen in Figure 7, and wherein the pawl end 42 is disengaged from the post 20. With the pawls 33 and 39 of the centrifugal jack 26, which is carried by the ring part 22a thus disengaged from the post 20, said ring part 22a is free to move outwardly of the casing 13 away from its inner wall 14 as the diametrically opposite ring part 22b moves inwardly toward the inner wall 14 of the casing.

It will be understood that this diametrical displacement of the ring 22 will be very slight and will occur as the ring part 22b is traveling through a bottom segment of its cycle of rotation. This aforedescribed operation will be repeated each time that the ring part 22b travels through the bottom segment of its revolution and while the ring part 22a is disposed diametrically thereabove, for displacing the ring 22 diametrically within the casing 13 toward the top thereof, and until a balancing of the wheel is accomplished in this manner. Thereafter, the centrifugal jacks 26 will remain substantially in their positions as seen in Figure 2 while the wheel is rotated.

It will be understood that the jack 26, associated with the ring part 22a, will operate in the same manner just previously described for the jack 26 of the ring part 22b if the unbalanced wheel is heavy adjacent the post 20. Likewise, either of the jacks 26 associated with the ring parts 23a or 23b may function for jacking the ring 23 upwardly for correcting an unbalanced condition existing adjacent either the post 21 or 21a, and in the same manner as previously described in detail.

The springs 45 function both as compression and tension springs to normally maintain the weighted lever arms 27 substantially in their positions as illustrated in Figure 2. Said springs 45 are tensioned to resist swinging movement of the lever arms outwardly to positions as seen in Figure 6 or inwardly to positions as seen in Figure 7.

It will thus be seen that a wheel balancing unit of extremely simple construction has been provided which may be readily mounted detachably on a wheel and brake drum and which will function automatically to correct any existing or subsequently occurring unbalanced condition of the wheel such as normally occurs in connection with vehicle wheels.

Various modifications and changes are contemplated and may obviously be restorted to, without departing from the spirit or scope of the invention as hereinafter defined by the appended claims.

I claim as my invention:

1. An automatic vehicle wheel balancer comprising an annular casing, supporting means connected to the casing and adapted to be engaged by wheel fastening lugs for connecting the casing detachably to a vehicle wheel and brake drum, an automatic wheel balancing unit mounted in said annular casing for automatically correcting a dynamically unbalanced condition of the wheel, said wheel balancing unit comprising circumferentially spaced posts secured in said casing and disposed radially thereof including pairs of posts disposed in diametrical alignment, balancing ring members disposed within said casing each including relatively wide diametrically opposed weighted segments and relatively narrow lighter segments extending between and connecting said weighted segments, said wide ring segments having aligned openings loosely engaging diametrically aligned posts of the wheel balancer, said posts being toothed to form racks, and a centrifugally responsive jack swingably supported on the outer side of each wide ring segment and having a pair of pivotally mounted pawls engaging the rack post of said ring segment, said jacks being selectively operative in response to a dynamically unbalanced condition of the wheel resulting in a heavy part of the wheel being located adjacent the weighted ring segment for causing the jack to be actuated centrifugally at each revolution of the wheel for displacing the ring segment to which it is connected radially inwardly of the wheel.

2. An automatic wheel balancer as in claim 1, said rings each being substantially rigid, and means forming a part of each centrifugal jack for disengaging the pawl of the associated jack from the rack post thereof to permit the adjacent weighted ring segment to be displaced radially outward of the wheel when the diametrically opposite ring segment thereto is displaced radially inward.

3. An automatic wheel balancer as in claim 2, each of said jacks including an elongated lever having a bifurcated inner end straddling the associated rack post thereof, means pivotally connecting the inner end of said lever to the weighted ring segment on which the jack is mounted, and said lever having an opposite weighted end.

4. An automatic wheel balancer as in claim 3, and double acting spring means connecting the weighted end to its associated weighted ring segment for resisting swinging movement of said weighted lever and toward and away from said ring segment.

5. An automatic wheel balancer as in claim 4, said pair of pawls of each jack being pivotally mounted on the lever in positions straddling the rack post.

6. An automatic wheel balancer as in claim 5, said pawls of each jack having free ends spaced outwardly from the weighted lever and constituting adjacent ends of said pair of pawls, and spring means individual to the pawls for urging said adjacent free ends of the pawls toward one another and into engagement with the rack post disposed therebetween.

7. An automatic vehicle wheel balancer as in claim 1, said balancing ring members being disposed in side by side relation, said narrow ring segments being longer than the weighted ring segments, and said weighted ring segments being disposed in loosely interfitting relation relative to one another.

8. An automatic vehicle wheel balancer as in claim 7, and leaf springs secured to said annular casing yieldably bearing against outer edges of the narrow ring segments of said ring members for urging the narrow ring segments of each ring member toward the wide ring segments of the other ring member.

9. An automatic vehicle wheel balancer as in claim 1, said annular casing being supported by said supporting means between the wheel rim and a brake drum on which the wheel is mounted, and said supporting means having fastening receiving openings adapted to be engaged by lug fastenings of the wheel for detachably connecting the wheel balancer to the wheel and brake drum.

10. An automatic vehicle wheel balancer comprising an annular chamber and supporting means connected to said chamber and adapted to be detachably connected to a vehicle wheel for mounting said annular chamber on the inner side of said wheel and concentrically thereof, a plurality of circumferentially spaced jack posts secured in said chamber and radially thereof including pairs of diametrically aligned posts, a pair of balancing rings mounted in said casing each including diametrically opposed relatively wide weighted ring segments and relatively narrow diametrically opposed connecting segments, said wide ring segments having openings loosely engaging diametrically aligned posts whereby said rings are mounted with the weighted segments thereof in staggered relation to one another, and swingably mounted jack units supported on the outer sides of the weighted ring segments and each having pivotally mounted means engaging the rack post individual thereto, said jack units being individually responsive to centrifugal force when disposed adjacent an unbalanced heavy portion of the wheel to displace the ring to which the jack is connected diametrically away from the unbalanced heavy part of the wheel as the wheel is revolved for correcting the wheel balance.

References Cited in the file of this patent

UNITED STATES PATENTS

| 444,081 | Wright | Jan. 6, 1891 |
|---|---|---|
| 2,420,592 | Gerhardt | May 13, 1947 |